Feb. 22, 1955
D. S. WILLSON ET AL
2,702,674
HOSE REELING APPARATUS
Filed Sept. 9, 1952
2 Sheets-Sheet 1
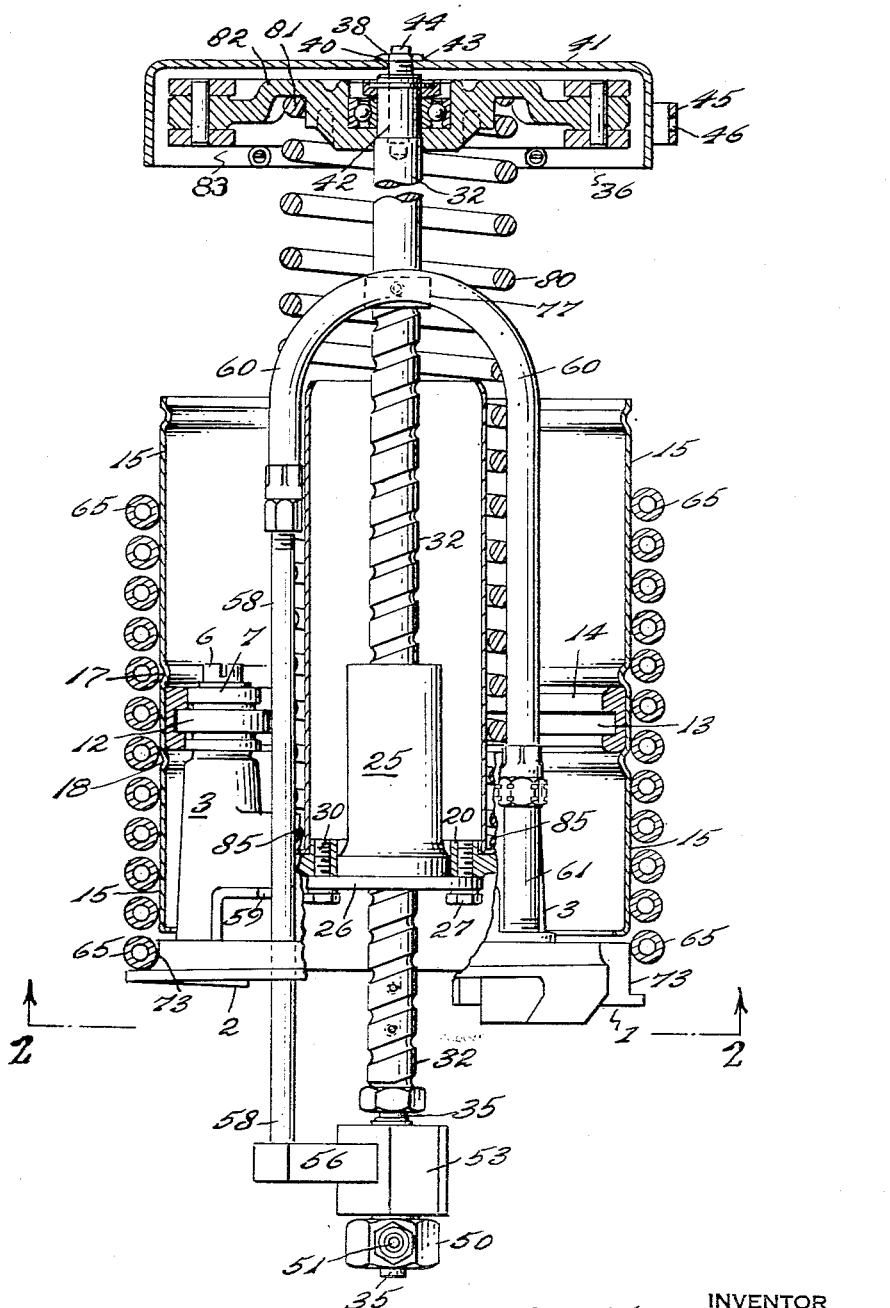
INVENTOR
David S. Willson
Joseph C. Woodford.
BY
ATTORNEY.

Feb. 22, 1955  D. S. WILLSON ET AL  2,702,674
HOSE REELING APPARATUS
Filed Sept. 9, 1952  2 Sheets-Sheet 2
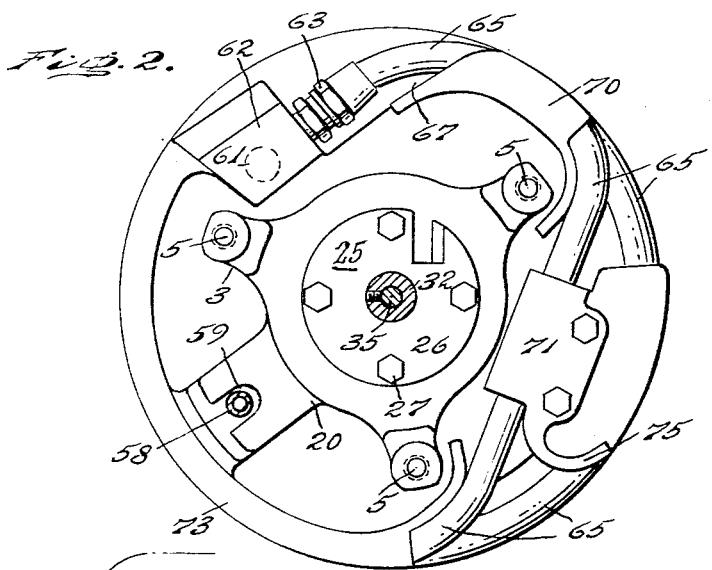
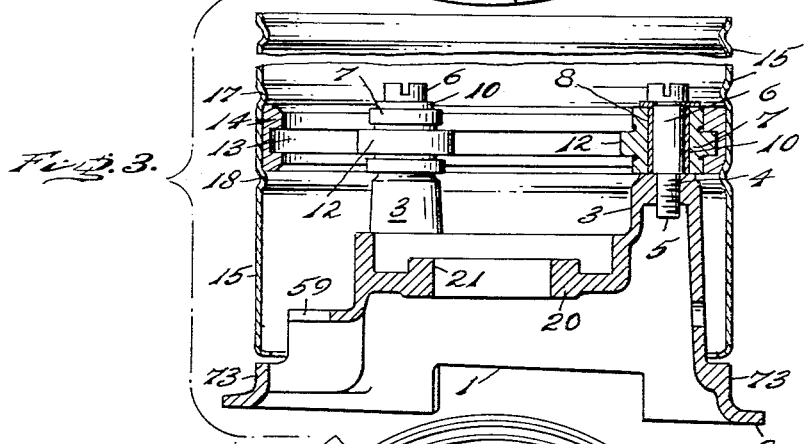
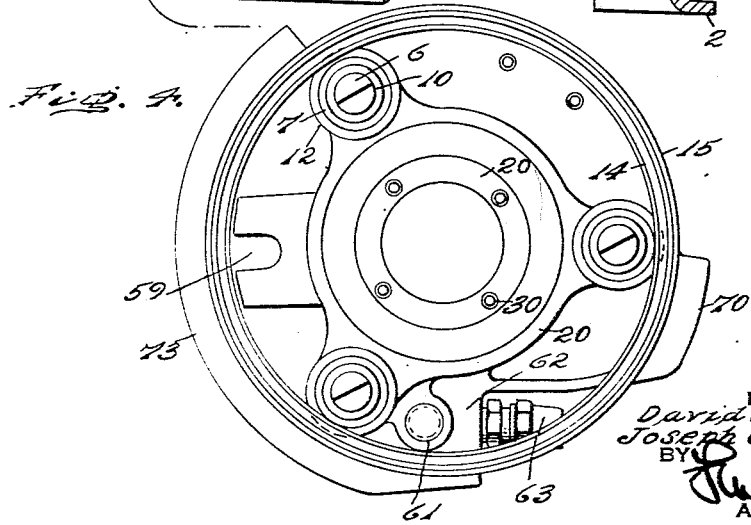
INVENTOR
David S. Willson
Joseph C. Woodford.
BY
ATTORNEY.

United States Patent Office 2,702,674
Patented Feb. 22, 1955

2,702,674

HOSE REELING APPARATUS

David S. Willson, Muskegon Heights, and Joseph C. Woodford, Spring Lake, Mich., assignors to John Wood Company, New York, N. Y., a corporation of Delaware Application September 9, 1952, Serial No. 308,624

5 Claims. (Cl. 242—86)

Our invention relates generally to flexible hose reeling mechanisms and particularly to automatic take-up hose reels of a construction adapted for use in automobile service stations, and the like, for the dispensing of air, water, etc. to automobiles. Our invention relates to improvements in the type of hose reeling apparatus disclosed in Martin Patents Nos. 2,478,494, 2,478,540, 2,550,120 and Rostine Patent No. 2,587,652.

Such type of hose reeling devices comprises a hose winding drum which is mounted for contemporaneous rotational and axial movements, preferably by associating the winding drum with a nut carried by a screw shaft, the pitch of which is such that the nut will travel along the shaft in response to pressure applied axially to the nut or winding drum. This type of hose reeling device is particularly adapted for use advantageously in automobile service stations, because it permits the use of a drum of relatively small diameter within a relatively small dimension outer housing, which housing is adaptable also for the support of other equipment, if so desired, such as tire inflating apparatus, pedestal lights, utility box-like structures for records, cash drawers, etc. Hose reeling devices of such a construction permit the withdrawal of the hose and the rewinding thereof at a single location through the outer housing wall.

Commercial use of the structures of the above-mentioned Martin and Rostine patents has demonstrated that the hose reeling apparatus as disclosed have certain undesirable inherent characteristics. When the structures of the Martin and Rostine patents are connected to the air supply and the hose pulled out and permitted to retract without air pressure in the hose, the effective forces of the main spring will pull the hose snugly around the drum. Thereafter, when the air supply is turned on to the hose, and if the hose be of the type which tends to shorten under pressure, the hose has a tendency to become tighter around the drum, as the hose cannot assume what would be its normal shortened length. If the operator then pulls the hose out and allows it to retract, it will assume its normal pressurized length around drum.

However, if the air pressure then be turned off, and the air pressure in the hose released due to leaks, the hose will tend to increase in length and will loosen about the drum. There would be some tendency for the drum to rotate a slight amount inside of such loosened coils, and usually the main spring forces will cause some slipping and tightening of the two top convolutions of hose due to the resistance of the hose at the means to prevent the hose from being completely retracted within the housing. Accordingly, the two top convolutions will be snugged up tight around the drum, and the convolutions below those two top coils may become loose enough so that they drop down toward the bottom of the drum. As a result, binding occurs irrespective of whether the air pressure is again turned on or off before the operator pulls out the hose. If the air pressure is turned on, there is a tendency of the hose to shorten, and it will tighten around the drum below its natural position.

If one convolution of the hose has dropped somewhat over another convolution so as to partly overlap, the tightening due to the introduction of air pressure may not pull the hose back into position all the way around the drum. As a result, the overlapping convolution of hose will rub on the inside of the outer housing, as there is but a limited clearance between the normal hose coil position and the outer housing. If the air pressure is not turned on before the operator starts to pull out the hose, the pulling of the hose will keep the two top convolutions snug and probably will pull out some of the looseness in the lower coils by actually sliding the coils on the drum. However, there usually is not sufficient slippage between the hose and drum which would permit the slack to be taken up completely. If at any point on the loosened convolutions of the hose, the hose should stick out far enough to rub against the housing, the mere action of rubbing as the hose is rotated will "feed" the slack in the convolutions toward the bottom of the reel at its point of attachment. Such "feeding" action will continue sometimes to a point where a loop is formed in the hose which results in considerable abrasion on the hose at that point, and also will result in the hose reel binding excessively.

If there were but very little hose to reel friction, the hose would not stick to the reel, and the reel would rotate inside the coil hose and take up immediately any such slack as discussed above. However, it would not be practical in commercial use to attempt to maintain the hose and drum in a lubricated condition, such as by wetting, etc.

The main object of our invention is to provide a loose connection between the drum flange and the major cylindrical portion of the drum so as to compensate for any change in hose length, and to permit the taking out of the slack in the hose as it is "fed" toward the point of attachment, and to thus prevent the formation of any undesirable loop of hose, as is likely to occur with the solid type of hose drum as disclosed in the aforementioned Martin and Rostine patents. In other words, it is the principal object of our invention to provide the structures disclosed in the Martin and Rostine patents with what might well be called a "floating drum," instead of the solid type of drum disclosed.

Our invention comprises the various novel features of construction and arrangement hereinafter more definitely specified.

In said drawings:

Fig. 1 is a vertical sectional view, partly in elevation, showing our improved hose reel drum apparatus.

Fig. 2 is a sectional view, taken on the line 2—2 in Fig. 1.

Fig. 3 is a fragmentary vertical sectional view of the drum shown in Fig. 1.

Fig. 4 is a top plan view of the drum as shown in Fig. 3.

Referring to said drawings; the drum supporting means indicated generally at 1 includes a bottom flange 2 which has a plurality of upwardly extending bosses 3, each of which is provided with a screw threaded opening 4 which is engaged by the screw threaded end 5 of a roller pin 6 to rigidly mount said pins 6 in the bosses 3. A roller 7, having an axial opening 8 therethrough, is mounted on each roller pin 6, with a sleeve bearing 10 interposed between the axial opening 8 in the roller 7 and the roller pin 6.

Each of the rollers 7 is provided with a circumferential flange portion 12 which is engaged in the annular recess 13 formed in the annular track ring 14. The track ring 14 is rigidly mounted in the hose winding drum 15, conveniently, by indentations 17 and 18 which are spun into the drum when the track ring 14 is in proper position therein, and which indentations 17 and 18 engage, respectively, the upper and lower edges of the track ring 14.

The arrangement is such that the drum 15 is capable of rotation independently of the drum supporting means, as the drum 15 is free to turn on the flanges 12 of the supporting rollers 7 engaged in the annular recess 13 of the drum track ring 14. The engagement of the flanges 12 in the recess 13 of the drum track ring 14 causes the drum 15 and drum supporting means to move axially up or down as a unitary structure.

The drum supporting means 1 is provided with a transverse web member 20 which has an axial opening 21 formed therein. The ball nut 25 is provided with a lower flange 26 which has a series of drilled openings therethrough for bolts 27 by which the ball nut 25 is rigidly mounted in the axial opening 21 by the bolts 27 engaging matching screw threaded openings 30 formed in the transverse web member 20.

The ball nut member 35 is provided with an internal screw thread in which is engaged the screw shaft 32. The ball nut, conveniently, is of the well-known form in which the threads in the shaft and nut form an internal raceway for two sets of recirculating steel bearing balls. As the ball nut 25 travels up or down, the bearing balls emerge from the threads and are diverted into external raceways through which they reenter the threads. The bearing balls are captive at all times and in such well known construction, which forms no part of our invention, friction is held down to a minimum.

The screw shaft 32 is provided at its lower end with a reduced diameter extension member 35, the lower end of which is fitted into an opening formed in a rigidly mounted transverse base plate (not shown) of an outer housing. A brake drum assembly, indicated generally at 36, is mounted on the upper end of the screw shaft 32 by means of the stud screw 38 which extends through an opening 40 in the brake drum housing 41 into a screw threaded opening 42 formed in the upper end of the shaft 32. The screw 38 is welded integrally to the brake drum housing 41, as indicated at 43. The upper end 44 of the screw shaft 38 is fitted into an opening formed in a rigidly mounted transverse plate of the outer housing.

The brake drum housing 41 is provided with an ear 45 which has a screw threaded opening 46 therethrough. When the brake drum assembly 36 is in proper position, the ear 45 is rigidly secured to the outer housing by means of a screw, not shown, which is engaged in the screw threaded opening 46. The brake means 36 forms no part of our invention.

The lower end of the screw shaft extension 35 is provided with a fluid inlet fitting 50, which includes a screw threaded coupling fitting 51. The fluid inlet fitting 50, conveniently, is of hexagonal outer shape, and rotation thereof is prevented by a bracket, not shown, which is mounted on the base plate, with an upper extending arm of the bracket fitting against one of the hexagonal sides of the fitting 50 in a well-known manner.

An internal fluid outlet from the fitting 50 is in communication with the fluid passageway in the swivel fitting 53 which is adapted to rotate freely on the extension 35 rigidly connected to the screw shaft 32. The swivel connection means 53 forms no part of our invention, and is of a construction such as shown and described in the aforesaid Martin Patent No. 2,505,418.

The fluid passageway in the swivel fitting 53 is in communication with the fluid passageway in the extension arm 56 of the swivel fitting 53. The outlet of the fluid passageway in the arm 56 is connected to an upwardly extending rigid pipe 58 which extends through an opening 59 formed in the web 20 of the drum supporting means 1. Thus, rotation of the drum supporting means will cause rotation of the swivel fitting 53.

The upper end of the pipe 58 is connected to an inverted U-shaped flexible conduit 60, the outlet end of which is connected to a pipe 61 which is in communication with the fluid passageway in the fitting 62 formed, conveniently, as part of the drum flange 2. The fitting 62 is provided with a screw threaded fluid outlet opening, and the dispensing hose 65 is connected to the fitting 62 conveniently by means of a screw threaded coupling 63 at the inner end of the hose, with the coupling 63 engaged in the screw threaded fluid outlet of the fitting 62.

From the coupling connection, the hose 65 is pulled around the periphery of the guide extension portion 67 of the fitting 62 and above the flanged portion 70 of said guide 67. The hose 65 is retained in fixed position at its inner end by means of the hose clamp 71 which securely engages the hose 65. From the clamp 71, the hose 65 then passes around the major portion of the hose guide flange 73 formed spirally on the base 2 of the drum supporting means to the drum 15, and around which it continues to be wound spirally upwards. The distal end of the hose 65 passes from the drum 15 through a guide roller plate assembly in the outer housing in the same manner as shown and described in detail in said Martin and Rostine patents.

It is to be noted that the drum assembly should be assembled in proper timing relation so as to assure that when the hose 65 is pulled out to its maximum distance from off the drum 15, and at which position the hose 65 would tend to swing around the curved end 75 of the clamp 71, the ball nut 25 will be at its maximum heighth, but not quite in contact with the collar 77 rigidly fastened on the screw shaft 32. The collar 77 is not used as a stop means when the apparatus is completely assembled, as the hose 65 itself limits further travel when pulled out to its maximum extent and the hose 65 begins to curve back on the curved end 75 of the clamp 71.

The main spring 80 has its upper end 81 in engagement with the member 82 of the brake arm assembly 83, and the lower end 85 of the main spring 80 is in engagement with the web 20 of the drum supporting means 1.

When the hose 65 is pulled out the main spring 80 is compressed, and when the hose 65 is then released to permit it to retract its maximum amount, the action of the main spring 80 will cause the ball nut 25 and drum assembly to move downwardly freely and to rotate so as to wind the hose 65 on the drum 15 until a stop means (not shown) at the distal end of the hose 65 comes in contact with the hose roller plate of the outer housing.

It is to be noted that in order for our hose reeling mechanism to operate properly, the hose 65 must never be larger in outside diameter than the pitch of the main screw shaft 32. Moreover, the hose 65 must not under any condition of service and wear be permitted to increase in outside diameter to a point where such outside diameter would exceed the pitch of the main screw shaft 32. Otherwise, the convolutions of the hose 65 would crowd tightly together and tend to climb either itself, or to gradually assume a position out of line with the true helix through the rollers in the roller plate assembly.

For practical commercial use of our apparatus, the hose 65 actually should be smaller in outside diameter than the pitch of the main screw shaft 32, which will result in the hose 65 under ordinary use having slight spacing between each convolution. Such slight spacing between the convolutions of the hose results in the hose 65 having a tendency to drop down out of its ordinary normal spiral position on the drum if the hose 65 should loosen on the drum.

The manner in which a hose is fabricated is a determining factor in whether the hose will stretch or shorten in its length when subjected to internal fluid pressures. A hose which is made with a so-called braided carcass wherein the threads are laid into the carcass at an angle usually will swell a slight amount when fluid pressure is applied internally. Such slight increase in the diameter of the hose by swelling also tends to shorten the hose. Other types of hoses of different fabrication tend to lengthen under the application of fluid pressure.

Commercial use of hose reeling apparatus such as disclosed in said Martin and Rostine patents has demonstrated that a 26 foot length of some types of hose may shorten as much as 20 to 25 inches under fluid pressure, while the same length of hose of different fabrication may lengthen as much as 10 inches. Therefore, with the use of the prior art solid type drums it has been found that successful commercial operation of such apparatus could be assured only if a hose be used which was susceptible to practically no variation in length under pressure, a condition almost impossible to attain in quantity production.

The rotatable connecting means between the drum supporting means and the major cylindrical portion of the drum of our improved "floating drum" construction provides a means to effectively compensate for hose length changes, as described supra, and also will effect the taking out of any slack in the hose as it may be "fed" toward the point of attachment, and thus prevent the formation of a loop as would occur with the use of the prior art solid type of drum. Our "floating drum" construction tends to produce two snug points, the two top coils and the two bottom coils, if the coiled hose should become loose around the drum under conditions such as described supra. As the hose is pulled out in our improved apparatus, the loose section of coils of hose between said tight coils is "fed" downwardly, and the slack is continually being taken out by rotation of the drum section 15 with respect to the drum supporting means 1.

We do not desire to limit ourselves to the specific details of construction, arrangement, or method of operation herein set forth, as it is obvious that various modifications may be made therein without departing from the essential features of our invention, as defined in the appended claims.

We claim:

1. In hose reeling mechanism which includes a screw shaft, a nut on said screw shaft, a winding drum surrounding said screw shaft and nut in spaced radial relationship, the winding drum and nut being rotatable and movable longitudinally of said screw shaft in response to a force applied axially of said drum and nut; said winding drum comprising a drum flange member; a cylindrical drum member; and means connecting said drum flange member and said cylindrical drum member in continuous fixed relationship for axial movement, said connecting means including means to permit said cylindrical drum member and said drum flange member to effect relative rotational movement with respect to each other.

2. In hose reeling mechanism which includes a screw shaft, a nut on said screw shaft, a winding drum surrounding said screw shaft and nut in spaced radial relationship, the winding drum and nut being rotatable and movable longitudinally of said screw shaft in response to a force applied axially of said drum and nut; said winding drum comprising a drum flange member; a cylindrical drum member; and roller means connecting said drum flange member and said cylindrical drum member in continuous fixed relationship for axial movement, said connecting means including means to permit said cylindrical drum member and said drum flange member to effect relative rotational movement with respect to each other.

3. In hose reeling mechanism which includes a screw shaft, a nut on said screw shaft, a winding drum surrounding said screw shaft and nut in spaced radial relationship, the winding drum and nut being rotatable and moveable longitudinally of said screw shaft in response to a force applied axially of said drum and nut; said winding drum comprising a drum flange member; a cylindrical drum member; roller means carried by said drum flange member; annular track means mounted in said cylindrical drum member and engaged by said roller means to maintain said drum flange member and said cylindrical drum member in continuous fixed relationship for axial movement, said annular track means adapted for movement circumferentially on said roller means to permit said cylindrical drum member and said drum flange member to effect relative rotational movement with respect to each other.

4. In hose reeling mechanism which includes a screw shaft, a nut on said screw shaft, a winding drum surrounding said screw shaft and nut in spaced radial relationship, the winding drum and nut being rotatable and movable longitudinally of said screw shaft in response to a force applied axially of said drum and nut; said winding drum comprising a drum flange member; a spiral guide flange formed on said drum flange member; roller means carried by said drum flange member; a cylindrical drum member; annular track means mounted in said cylindrical drum member and engaged by said roller means to maintain said drum flange member and said cylindrical drum member in continuous fixed relationship for axial movement, said annular track means adapted for movement circumferentially on said roller means to permit said cylindrical drum member and said drum flange member to effect relative rotational movement with respect to each other.

5. In hose reeling mechanism which includes a screw shaft, a nut on said screw shaft, a winding drum surrounding said screw shaft and nut in spaced radial relationship, the winding drum and nut being rotatable and movable longitudinally of said screw shaft in response to a force applied axially of said drum and nut; said winding drum comprising a drum flange member; a cylindrical drum member; clamping means for rigidly securing a hose to said drum flange member; a curved extension on said clamping means adapted to be engaged by said hose when said hose has been withdrawn to its maximum extent from said drum member and said drum flange member; a spiral guide flange for said hose formed on said drum flange member; roller means carried by said drum flange member; a recessed annular track means mounted in said cylindrical drum member and engaged by said roller means to maintain said drum flange member and said cylindrical drum member in continuous fixed relationship for axial movement, said recessed annular tank means adapted for movement circumferentially on said roller means to permit said cylindrical drum member and said drum flange member to effect relative rotational movement with respect to each other.

References Cited in the file of this patent

UNITED STATES PATENTS

| | | |
|---|---|---|
| 2,478,494 | Martin | Aug. 9, 1949 |
| 2,478,540 | Martin | Aug. 9, 1949 |
| 2,598,306 | Rostine | May 27, 1952 |